United States Patent
Nakayama et al.

(10) Patent No.: US 11,292,508 B2
(45) Date of Patent: Apr. 5, 2022

(54) ELECTRIC POWER STEERING DEVICE AND RACK ASSIST-TYPE STEERING DEVICE

(71) Applicant: Hitachi Automotive Systems, Ltd., Hitachinaka (JP)

(72) Inventors: Kenji Nakayama, Hitachinaka (JP); Hiroshi Kanazawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 420 days.

(21) Appl. No.: 16/476,345

(22) PCT Filed: Jan. 17, 2018

(86) PCT No.: PCT/JP2018/001140
§ 371 (c)(1),
(2) Date: Jul. 8, 2019

(87) PCT Pub. No.: WO2018/142932
PCT Pub. Date: Aug. 9, 2018

(65) Prior Publication Data
US 2020/0039578 A1 Feb. 6, 2020

(30) Foreign Application Priority Data
Feb. 6, 2017 (JP) .............................. JP2017-019199

(51) Int. Cl.
*B62D 5/04* (2006.01)
(52) U.S. Cl.
CPC ........... *B62D 5/0406* (2013.01); *B62D 5/046* (2013.01); *B62D 5/0475* (2013.01)
(58) Field of Classification Search
None
See application file for complete search history.

(56) References Cited

U.S. PATENT DOCUMENTS

| 2009/0133956 A1 | 5/2009 | Itoh |
| 2020/0366167 A1* | 11/2020 | Sugiura .................. H02K 11/40 |

FOREIGN PATENT DOCUMENTS

| CN | 112567604 A * | 3/2021 | ............... H02K 3/50 |
| JP | S62-230334 A | 10/1987 | |

(Continued)

OTHER PUBLICATIONS

International Search Report with English translation and Written Opinion issued in corresponding application No. PCT/JP2018/001140 dated Apr. 10, 2018.

*Primary Examiner* — Kevin Hurley
(74) *Attorney, Agent, or Firm* — Foley & Lardner LLP (57) ABSTRACT

There is provided a novel electric power steering device capable of continuing a steering assist function as much as possible even in an environment where moisture enters inside a housing of an electric motor due to breakage of a rubber boot and an electrical short circuit phenomenon occurs.

A stator 14 around which a winding is wound is vertically divided into two areas in the direction of gravity, a winding 16 of one system is wound in the upper stator area of the stator 14 while the winding 16 of the other system is wound in the lower stator area of the stator 14, and power of the winding of one system is controlled by an electronic control means 33 of one system while power of the winding of the other system is controlled by an electronic control means 34 of the other system. Even if moisture enters inside the housing of the electric motor due to breakage of the rubber boot, occurrence of the electrical short circuit phenomenon is suppressed at least in the winding wound on the upper side, whereby the steering assist can be continued.

7 Claims, 10 Drawing Sheets

(56) References Cited

FOREIGN PATENT DOCUMENTS

| | | |
|---|---|---|
| JP | 2005-237068 A | 9/2005 |
| JP | 2007-331639 A | 12/2007 |
| JP | 2011-131612 A | 7/2011 |

\* cited by examiner

ELECTRIC POWER STEERING DEVICE AND RACK ASSIST-TYPE STEERING DEVICE

TECHNICAL FIELD

The present invention relates to an electric power steering device, and more particularly to an electric power steering device having two electric motor systems, and a rack assist-type steering device using the same.

BACKGROUND ART

In an electric power steering device of a vehicle, a revolving direction and revolving force of a steering shaft revolved by a driver's operation of a steering wheel is detected, and an electric motor is driven to revolve in the direction same as the revolving direction of the steering shaft on the basis of the detected values, thereby generating steering assist force. In addition, an electronic control unit is included in the power steering device to control the electric motor.

In this type of the electric power steering device, a three-phase AC electric motor is used to assist steering operation, and a power conversion circuit including an inverter circuit is used to control and drive the three-phase AC electric motor. Incidentally, when the electric motor fails, the steering assist force cannot be generated, whereby there may be a high possibility that the driver's steering becomes difficult. In view of the above, in recent years, there has been proposed an electric power steering device in which a winding wound around a stator included in an electric motor and an power conversion circuit for controlling power supplied to the winding are configured in two systems so that, even if failure occurs in one of the systems, steering assist force is generated in the other system to support driver's steering.

Such an electric power steering device including the electric motor in two systems has been well known as disclosed in a number of documents. For example, JP 2007-331639 A (PTL 1) discloses an electric power steering device using the following two electric motor systems. In PTL 1, there is disclosed an electric power steering device in which a winding to be wound around a stator is configured to be two winding systems and the winding in one system to be wound around the stator is divided into two and disposed at opposing positions of 180° while the winding in the other system is also divided into two and disposed at opposing positions of 180° rotated by 90° with the winding position of one system.

CITATION LIST

Patent Literature

PTL 1: JP 2007-331639 A

SUMMARY OF INVENTION

Technical Problem

In a rack assist-type steering device using an electric power steering device, a rubber boot covers a rack case and a rack shaft. This rubber boot is damaged at times by pebbles bounced during traveling or obstacles on the road. It is assumed that, when it is traveling in the rain in this state, or traveling on a puddled road, moisture (hereinafter represen- tatively referred to as rainwater or the like) penetrates from the damaged portion of the rubber boot. In that case, in the rack assist-type steering device, the electric motor of the electric power steering device is typically disposed at a position lower than the rack shaft or the rubber boot, that is, on the bottom side, so that the rainwater or the like that has entered the rubber boot may further enter inside the housing of the electric motor.

In the PTL 1, the winding in two systems is divided into four and wound around the stator. Accordingly, when the rainwater or the like enters inside the housing of the electric motor, the windings of both of the two systems are immersed in the rainwater, whereby there has been a possibility that an electrical short circuit phenomenon of the winding may occur in the case where coating of the winding is damaged. Note that, even in the case of the winding in two systems in which the winding of the stator is divided into two, the problem described above may occur depending on the winding position of the winding. If the electric motor fails due to the short circuit phenomenon, the steering assist force cannot be generated, whereby there may be a high possibility that the driver's steering becomes difficult.

It is an object of the present invention to provide a novel electric power steering device capable of continuing a steering assist function as much as possible even in an environment where rainwater or the like enters inside a housing of an electric motor due to breakage of a rubber boot and an electrical short circuit phenomenon occurs, and a steering device using the same.

Solution to Problem

The present invention is characterized in that a stator around which a winding is wound is vertically divided into two areas in the direction of gravity, a winding of one system is wound in the upper stator area of the stator while a winding of the other system is wound in the lower stator area of the stator, and power of the winding of one system is controlled by an electronic control means of one system while power of the winding of the other system is controlled by an electronic control means of the other system.

Advantageous Effects of Invention

According to the present invention, even if rainwater or the like enters inside a housing of an electric motor due to breakage of a rubber boot, occurrence of an electrical short circuit phenomenon is suppressed at least in the winding wound on the upper side, whereby a steering assist can be continued.

DESCRIPTION OF EMBODIMENTS

Hereinafter, embodiments of the present invention will be described in detail with reference to the accompanying drawings. Note that the present invention is not limited to the embodiments to be described below, and various modifications and application examples within the technical concept of the present invention are also included.

First Embodiment

Figure 1:
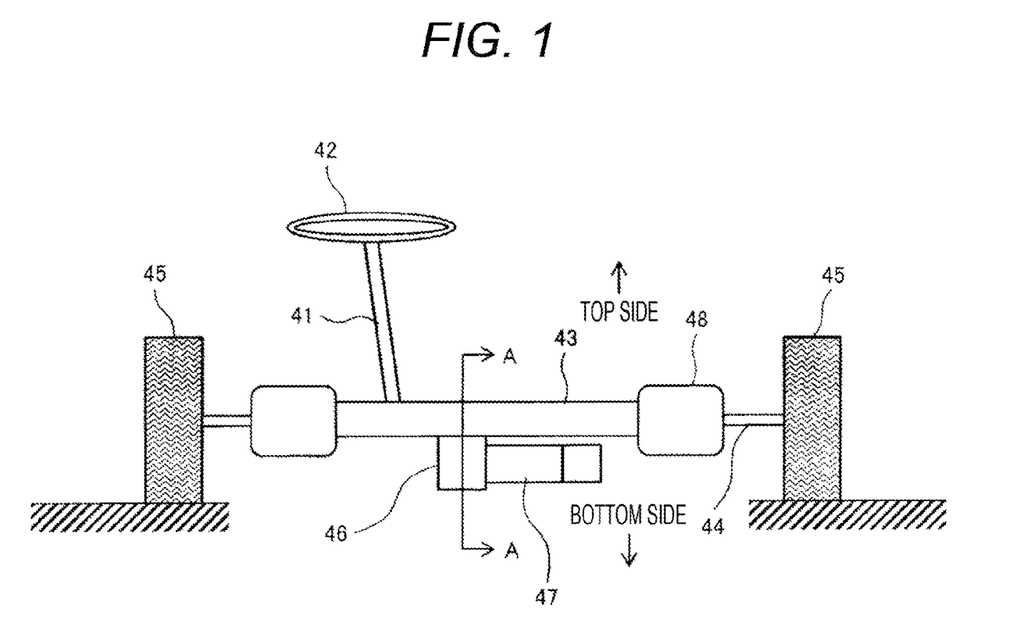
FIG. 1 is a configuration diagram illustrating a configuration of a rack assist-type steering device using an electric power steering device.

FIG. 1 illustrates a configuration of a rack assist-type steering device (hereinafter referred to as electric power steering system). When a driver operates a steering wheel 42, the electric power steering system assists the steering force using an electric motor provided in a rack case, which has a structure in which a rack shaft 44 is converted into linear motion via a reduction gear on an extension of the motor shaft. When the driver operates the steering wheel 42, a torque sensor (not illustrated) detects the rotation of a steering shaft 41, and transmits a detection signal to an electromechanical electric power steering device 47.

A controller applies a drive current to the electric motor on the basis of the detection signal, whereby the electric motor rotates. A reduction gear is disposed between the rack shaft 44 and the motor shaft. This reduction gear convers the torque of the motor shaft into linear motion that moves the rack shaft 44 laterally. This operation allows a tire 45 to perform a lateral turning motion. FIG. 1 illustrates a state in which the entire structure of the electric power steering system is viewed from the front side of a vehicle, which is a state in which the upper surface of the steering wheel 42 indicates a "top side" and the lower surface of the electric power steering device 47 indicates a "bottom side", and the electric power steering device 47 is disposed on the road surface side of the rack shaft 44.

In this case, in a case where a rubber boot 48 disposed on the connecting portion of the rack shaft 44 and a rack case 43 is damaged, rainwater or the like enters inside the rubber boot 48. The rainwater or the like that has penetrated is accumulated in a reduction gear case 46, which is the lowest part, and there is a possibility that the function of the reduction gear may be impaired due to rusting of the reduction gear or entering of sand mixed with the rainwater. Moreover, when the rainwater or the like accumulates in the lower part of the reduction gear case 46, the rainwater or the like also enters inside the housing of the electric motor of the electric power steering device 47 disposed next to the reduction gear case 46.

Therefore, in a case where the coating of the winding of the electric motor is damaged, a short circuit of wire connection and a brake torque are generated due to the rainwater or the like inside the housing of the electric motor so that the assist function for moving the rack shaft laterally cannot be obtained, whereby there is a high possibility that turning of the steering wheel 42 may become heavy. It is also obvious that the short circuit of the wire connection may occur even if the coating of the winding is not damaged. In view of the above, it is necessary to achieve a configuration for continuing the assist function of the rack shaft 44 as much as possible even in the case where rainwater or the like enters inside the electric power steering device 47.

Figure 2:
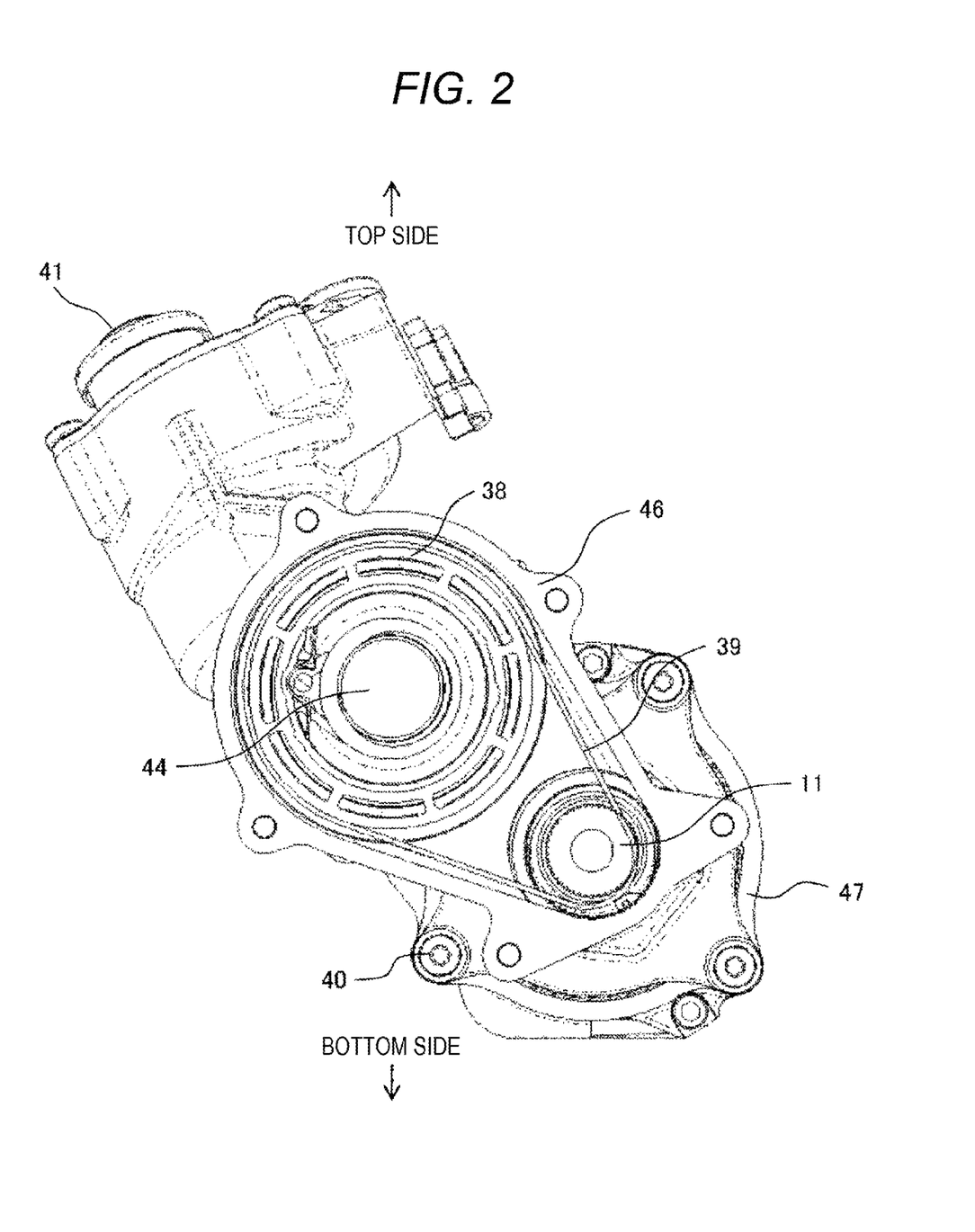
FIG. 2 is a cross-sectional view illustrating a cross-section of a rack assist portion illustrated in FIG. 1, which is taken along line A-A.

FIG. 2 illustrates a cross-sectional view of the reduction gear case 46 illustrated in FIG. 1, which is taken along line A-A. The electric power steering device 47 and the reduction gear case 46 are fixed to each other by a fastening bolt 40. A motor pulley 11 and a gear pulley 38 are disposed inside the reduction gear case 46, and the torque of the motor pulley 11 of the electric motor attached to the electric power steering device 47 is transmitted to the gear pulley 38 via a belt 39. A reducer mechanism incorporated in the reduction gear case 46 performs conversion into linear motion for moving the rack shaft 44 laterally using a rotation/linear motion conversion mechanism, and executes, on the basis of this operation, a steering assist function for turning the tire laterally. An electric power steering device for providing such a steering assist function is a well-known technique.

Here, a layout of mounting each unit on the vehicle is such that, when viewed in the direction of gravity, the upper surface of the steering shaft 41 of the reduction gear case 46 is on the top side, and the lower surface of the electric power steering device 47 is on the bottom side. Accordingly, in a case where the rubber boot 48 is damaged and rainwater or the like enters the vicinity of the rack shaft 44, the rainwater tends to accumulate in the vicinity of the motor pulley 11 assembled to the electric power steering device 47 disposed on the lowest bottom side of the reduction gear case 46.

Figure 3:
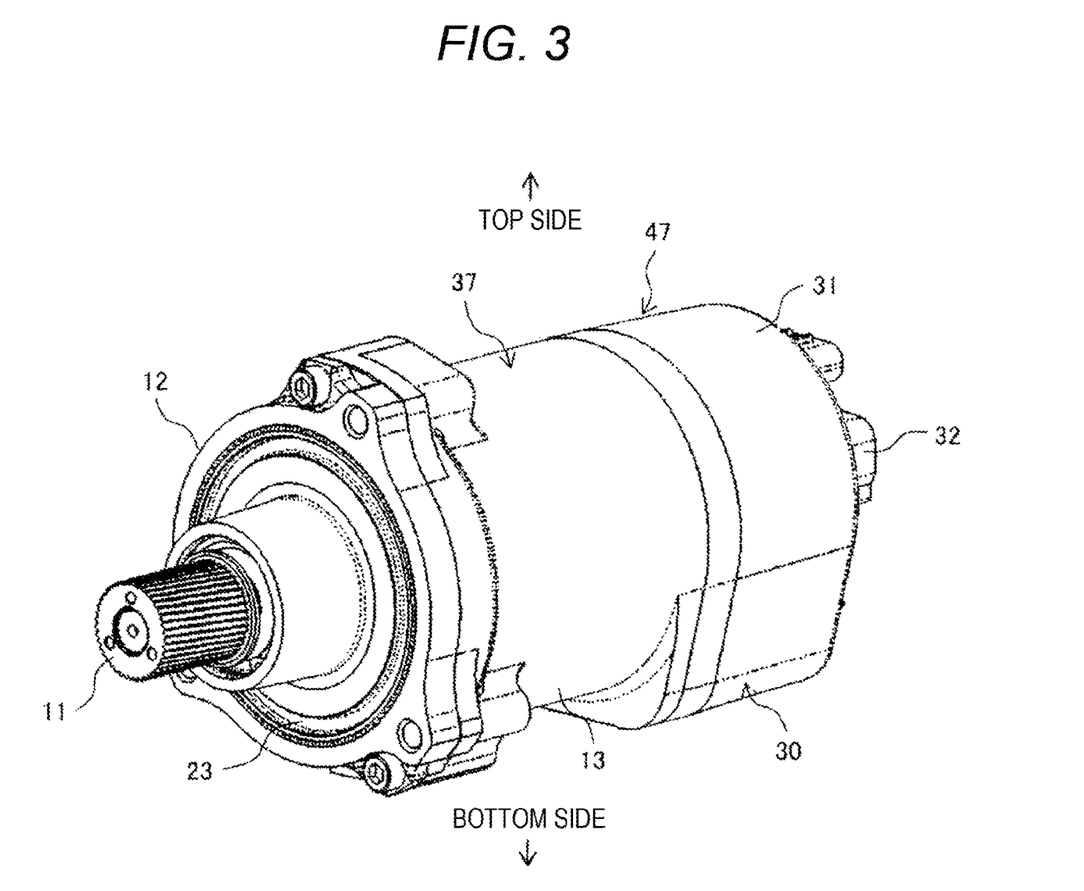
FIG. 3 is an external perspective view of the electric power steering device used for the rack assist-type steering device.

FIG. 3 illustrates the electric power steering device 47 to be attached to the reduction gear case 46, and the electric power steering device 47 includes an electric motor unit 37 and an electronic control unit 30. A casing of the electric motor unit 37 includes a housing 13 and a front bracket 12, and an electric motor is incorporated inside thereof. The motor pulley 11 is provided at a shaft tip portion of the electric motor, and as described above, the torque of the motor pulley 11 is transmitted to the gear pulley 38 via the belt 39.

On the opposite side of the motor pulley 11, there is disposed the electronic control unit 30 incorporating an electronic controller including a power conversion circuit using a control board and a metal-oxide semiconductor field-effect transistor (MOSFET), and the outer circumference side of the control board and the power conversion circuit are covered and protected by a metallic case 31. Further, a connector 32 for supplying power to the control board and the power conversion circuit is provided outside the case 31.

Although illustration is omitted, the front bracket of the electric motor unit 37 is fixed to, using a sealing material (not illustrated), the reduction gear case 46 with a seal groove 23 being provided with a waterproof function. It is assumed that the waterproof rubber boot 48 provided at the connecting portion of the rack case 43 and the rack shaft 44 described above is damaged due to aging degradation and mechanical impact from the outside. Accordingly, rainwater or the like may penetrate from the damaged portion of the rubber boot 48, and the rainwater may further penetrate inside the housing 13 of the electric motor unit 37.

As described above, the layout of mounting the electric power steering device 47 on the vehicle is such that, as illustrated in the drawing, the upper half of the circular portion of the housing 13 and the case 31 is on the "top side", and the lower half is on the "bottom side" when viewed in the direction of gravity.

Figure 4:
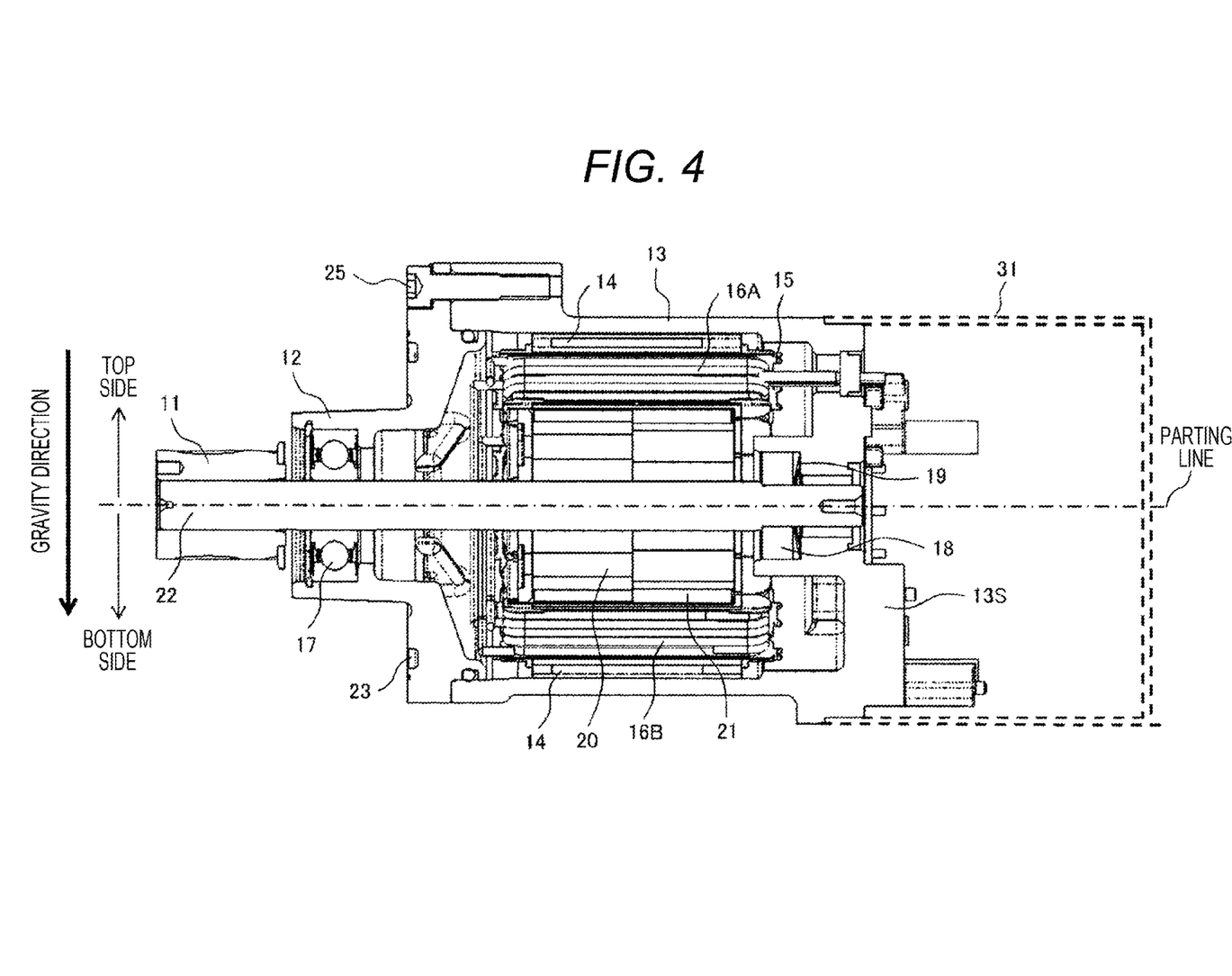
FIG. 4 is a cross-sectional view of an electric motor unit of the electric power steering device illustrated in FIG. 3.

FIG. 4 illustrates a cross-section of the electric motor unit 37 illustrated in FIG. 3, and the configuration thereof will be briefly described. A motor shaft 22 is disposed at the center of the electric motor, and the motor pulley 11 is disposed at the tip thereof. A rotor core 20 is fixed near the center of the motor shaft 22 in a state where it is skewed by two stages. A permanent magnet 21 is attached to the outer periphery of the rotor core 20, and the outer periphery is covered with a magnet cover (not illustrated).

The motor shaft 22 is supported by a front bearing 17 attached to the front bracket 12, and a rear bearing 18 attached to the housing 13. Note that the rear bearing 18 is pressed to the side of the rotor core 20 by a preload spring 19. The front bracket 12 is fixed to the housing 13 using a fastening bolt 25 to seal the electric motor. However, a slight gap is formed between the front bracket 12 and the motor shaft 22 to rotate the motor shaft 22, and rainwater or the like enters inside the housing 13 through the gap.

Inside the housing 13, a divided stator core 14 is formed in an annular shape by welding or non-welding, and is fixed by press-fitting or shrink-fitting. A bobbin 15 is then attached to the stator core 14, and an upper winding 16A and a lower winding 16B are wound around the outer periphery of the bobbin 15 to form a stator. Here, the upper winding 16A and the lower winding 16B are formed as windings in two systems.

That is, the stator core 14 around which the upper winding 16A and the lower winding 16B are wound is vertically divided into two areas of the "top side" and the "bottom side" at the position of the axial line (=parting line) of the motor shaft 22 with a plane orthogonal to the direction of gravity serving as a boundary. The upper winding 16A of one system is wound in the upper stator area (upper side of the parting line) of the stator core 14, and the lower winding 16B of the other system is wound in the lower stator area (lower side of the parting line) of the stator core 14. Further, power of the upper winding 16A of one system is controlled by an electronic control means of one system, and power of the lower winding 16B of the other system is controlled by an electronic control means of the other system, individually. This will be described in detail with reference to FIG. 7.

When rainwater or the like enters inside the housing 13, the lower winding 16B first contacts the rainwater or the like, and then the upper winding 16A contacts the rainwater or the like. The risk of causing a short circuit phenomenon of the wire connection due to the rainwater or the like is therefore larger in the lower winding 16B than in the upper winding 16A. However, compared with a case where both of the upper winding 16A and the lower winding 16B are subject to the short circuit of the wire connection, the period in which the upper winding 16A is in the normal state can be extended. As described above, although the capability of the steering assist function is lowered, it becomes possible to maintain the steering assist function for a longer time.

Further, a through hole (not illustrated) is provided in a side wall 13S of the housing 13, through which lead wires of the upper winding 16A and the lower winding 16B wound around the stator core 14 are pulled out from the inside of the housing 13 in the longitudinal direction of the motor shaft 22. The lead wires of the upper winding 16A and the lower winding 16B pulled out from the inside of the housing 13 are electrically connected to a terminal (not illustrated) of the power conversion circuit of the electronic control unit 30, which is disposed on the opposite side of the motor pulley 11, by welding or soldering. Power is supplied from the electronic control unit 30 to the upper winding 16A and the lower winding 16B to rotate the rotor core 20, and the torque of the motor pulley 11 is applied to the gear pulley 38 via the belt 39 accordingly, thereby being converted into linear motion for moving the rack shaft 44 laterally using the reducer mechanism.

Moreover, a magnetic pole sensor (not illustrated) is attached to the side of the electronic control unit 30 on the side opposite to the motor pulley 11 side of the motor shaft 22 so that a magnetic pole position of the rotor can be detected by a detection element included in the electronic control unit 30, such as a giant magnetoresistance (GMR) element.

Note that, although it is not illustrated in detail in FIG. 4, the portion at which the inside of the electric motor unit 37 and the inside of the electronic control unit 30 are connected is subject to a waterproof measure by a waterproof wall (see FIGS. 6A and 6B) made of a synthetic resin, metal, or the like being formed. As a result, rainwater or the like that has entered inside the housing 13 of the electric motor unit 37 does not enter the inside of the electronic control unit 30, whereby the electrical safety of the electronic control unit 30 can be secured.

Figure 5:
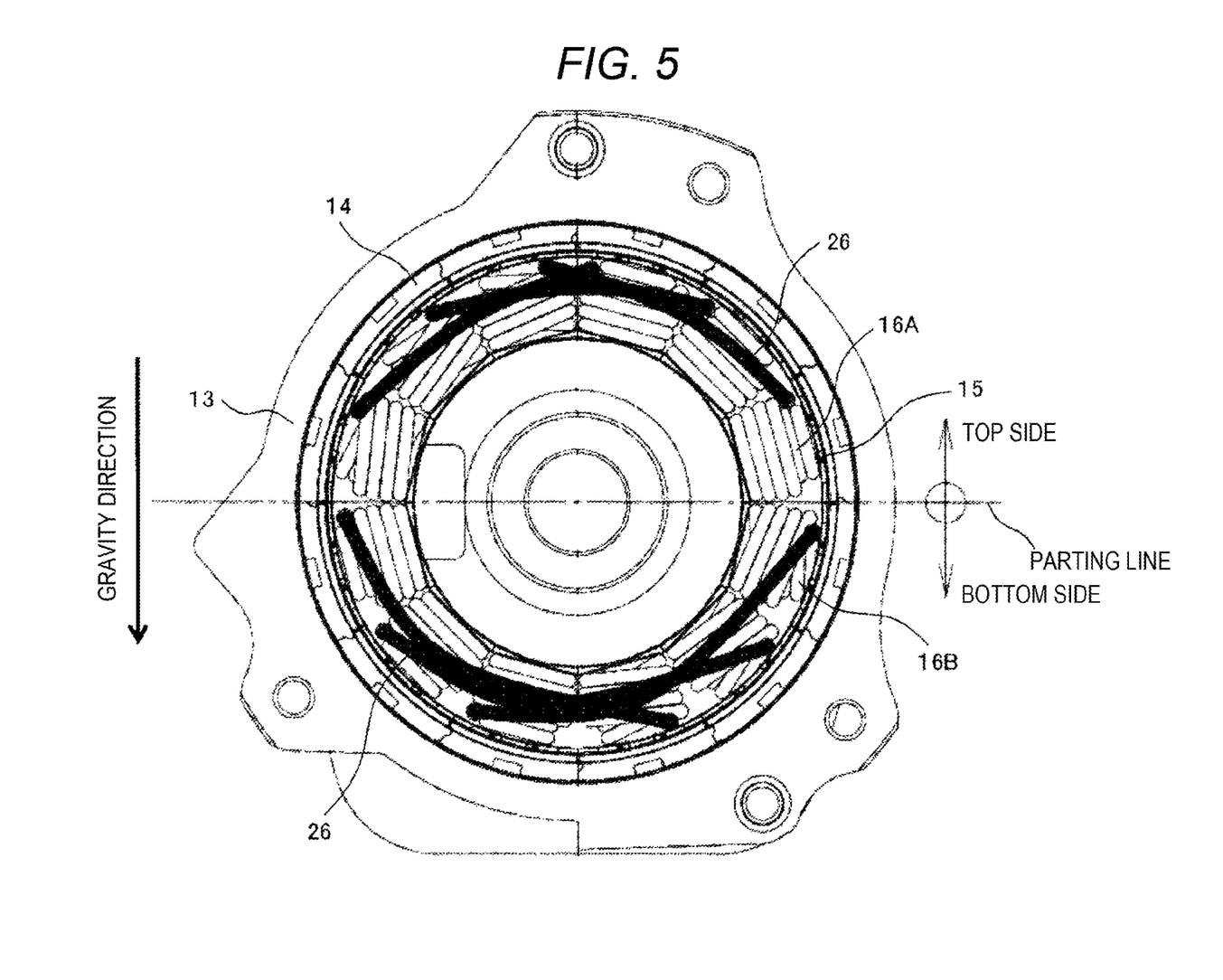
FIG. 5 is a front view of the electric motor unit viewed from the side of a front bracket.

FIG. 5 illustrates a state in which the stator core 14 around which the upper winding 16A and the lower winding 16B are wound is housed in the housing 13. The bobbin 15 is attached to the divided stator core 14, two windings 16A and 16B are continuously wound around the outer periphery of the bobbin 15, and the divided stator core 14 is fixed to the inner peripheral surface of the housing 13 by press-fitting or shrink-fitting while it holds the annular shape by welding or non-welding.

Further, in the upper area (180° area) of the stator core 14 located on the "top side" above the parting line that is the axial line of the motor shaft 22 illustrated in FIG. 5, a three-phase winding and a neutral point winding of one system (hereinafter referred to as A-system) are disposed. Note that the winding of each phase is made two continuous windings, and the winding of each phase is divided into two and connected using a jumper wire 26.

On the other hand, in the lower area (180° area) of the stator core 14 located on the "bottom side" below the parting line that is the axial line of the motor shaft 22, a three-phase winding and a neutral point winding of the other system (hereinafter referred to as B-system) are disposed. Note that the winding of each phase is also made two continuous windings, and the winding of each phase is divided into two and connected using the jumper wire 26.

Rainwater or the like tends to accumulate inside the housing 13 of the electric motor unit 37 from the "bottom side". As described above, the A-system winding 16A is disposed on the "top side", and the B-system winding 16B is disposed on the "bottom side". Accordingly, the operational state in which turning of the steering wheel 42 becomes heavy when a short circuit of the wire connection occurs due to penetration of rainwater or the like and a brake torque is generated occurs from the side of the B-system winding 16B disposed on the "bottom side".

When a short circuit of the wire connection occurs in the B-system winding 16B, the electronic control unit 30 opens the wire connection of the neutral point of the winding 16B to release the brake torque, and stops the operation of the B-system. Meanwhile, by continuing the operation of the A-system on the "top side", about a half of the steering assist function can be obtained until the "bottom side" inside the housing 13 is submerged. Therefore, the steering assist function of the steering can be continued accordingly, and the period until the steering assist function of the steering stops can be delayed. As a result, the assist function can be continued as much as possible to improve the functional safety of the power steering system.

Figure 6A:
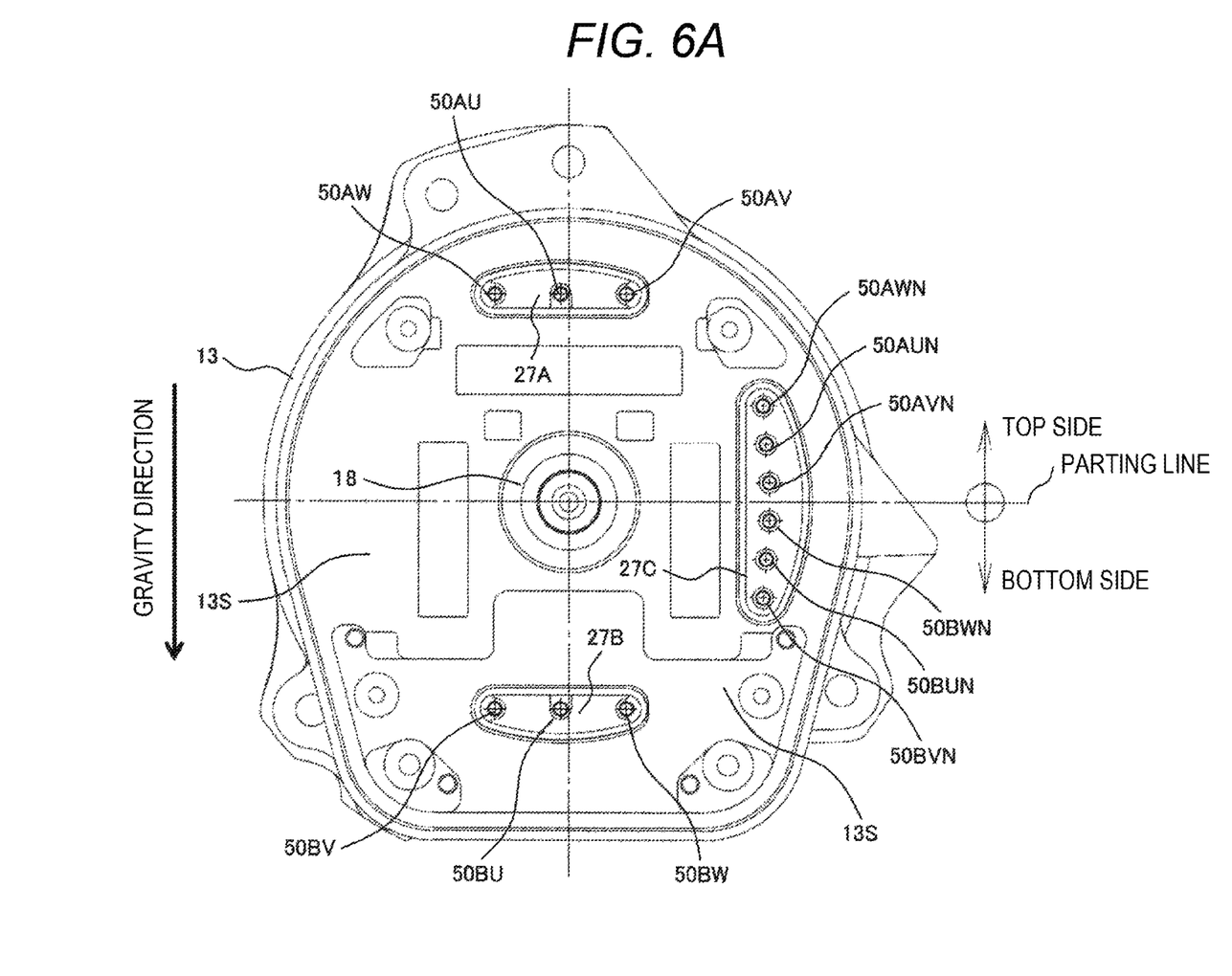
FIG. 6A is a front view of an exemplary side surface of a housing viewed from the side of an electronic control unit.

FIG. 6A illustrates the shape of the waterproof wall viewed from the electronic control unit 30. The waterproof wall includes the side wall 13S of the housing 13, and winding guides 27A, 27B, and 27C made of a synthetic resin or metal, which are attached to a lead wire lead-out opening formed in the side wall 13S. The side wall 13S and the winding guides 27A, 27B, and 27C are adhesively fixed by a waterproof adhesive agent.

Further, the winding guide 27A for guiding the A-system lead wire is formed on the "top side", the winding guide 27B for guiding the B-system lead wire is formed on the "bottom side", and the winding guide 27C for guiding, with the parting line serving as a boundary, the lead wires of the neutral points of the A-system and the B-system is formed.

The winding guide 27A includes a U-phase lead wire 50AU, a V-phase lead wire 50AV, and a W-phase lead wire 50AW, which are in the A-system. The winding guide 27B includes a U-phase lead wire 50BU, a V-phase lead wire 50BV, and a W-phase lead wire 50BW, which are in the B-system. Furthermore, the winding guide 27C includes, on the "top side", a U-phase neutral lead wire 50AUN, a V-phase neutral lead wire 50AVN, and a W-phase neutral lead wire 50AWN, which are in the A-system, and includes, on the "bottom side", a U-phase neutral lead wire 50BUN, a V-phase neutral lead wire 50BVN, and a W-phase neutral lead wire 50BWN, which are in the B-system.

Each of the lead wires 50AU to 50BWN is guided from the inside of the housing 13 toward the electronic control unit 30 while securing positional accuracy with the mounting portion of the electronic control unit 30 using the winding guides 27A to 27C. In order to connect each of the lead wires 50AU to 50BWN to the electronic control unit 30, the insulating film of the tip of each of the lead wires 50AU to 50BWN is peeled off to be in a state being subject to preliminary soldering (not illustrated).

In addition, a waterproof function between the electric motor unit 37 and the electronic control unit 30 is also provided in the gap of the rear bearing 18 by a cup-shaped waterproof member and an adhesive agent being combined.

Figure 6B:
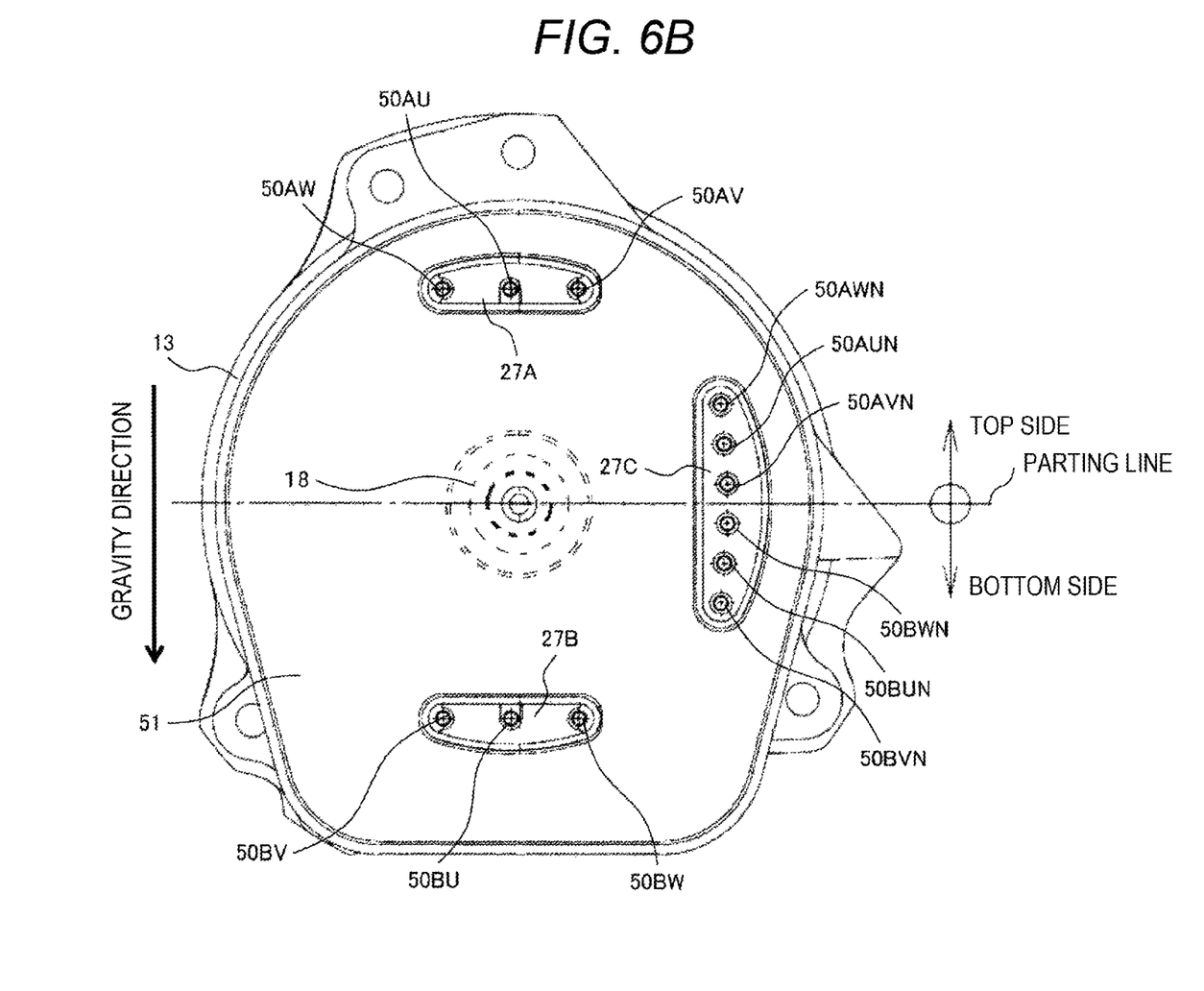
FIG. 6B is a front view of another exemplary side surface of the housing viewed from the side of the electronic control unit.

FIG. 6B illustrates another exemplary shape of the waterproof wall viewed from the electronic control unit 30. This waterproof wall 51 is a flat plate made of a synthetic resin, which is disposed adjacent to the side wall 13S illustrated in FIG. 4. Further, the winding guide 27A for guiding the A-system lead wire is integrally formed on the "top side", the winding guide 27B for guiding the B-system lead wire is integrally formed on the "bottom side", and the winding guide 27C for guiding, with the parting line serving as a boundary, the lead wires of the neutral points of the A-system and the B-system is integrally formed.

The winding guide 27A includes a U-phase lead wire 50AU, a V-phase lead wire 50AV, and a W-phase lead wire 50AW, which are in the A-system. The winding guide 27B includes a U-phase lead wire 50BU, a V-phase lead wire 50BV, and a W-phase lead wire 50BW, which are in the B-system. Furthermore, the winding guide 27C includes, on the "top side", a U-phase neutral lead wire 50AUN, a V-phase neutral lead wire 50AVN, and a W-phase neutral lead wire 50AWN, which are in the A-system, and includes, on the "bottom side", a U-phase neutral lead wire 50BUN, a V-phase neutral lead wire 50BVN, and a W-phase neutral lead wire 50BWN, which are in the B-system.

Each of the lead wires 50AU to 50BWN is guided from the inside of the housing 13 toward the electronic control unit 30 while securing positional accuracy with the mounting portion of the electronic control unit 30 using the winding guides 27A to 27C. In order to connect each of the lead wires 50AU to 50BWN to the electronic control unit 30, the insulating film of the tip of each of the lead wires 50AU to 50BWN is peeled off to be in a state being subject to preliminary soldering (not illustrated).

Furthermore, a waterproof adhesive agent (not illustrated) or the like is applied to the gap between the outer peripheral edge of the waterproof wall 51 and the housing 13 to fix the waterproof wall 51 and to provide a waterproof function between the electric motor unit 37 and the electronic control unit 30.

Next, a connection circuit of the two-system winding and the electronic control unit will be described with reference to FIGS. 7 to 9. Here, the parting line illustrated in FIGS. 7 to 9 corresponds to the parting line illustrated in FIG. 4, which indicates that it is vertically divided into two areas of the "top side" and the "bottom side" at the position of the axial line (=parting line) of the motor shaft 22 with a plane orthogonal to the direction of gravity serving as a boundary.

Figure 7:
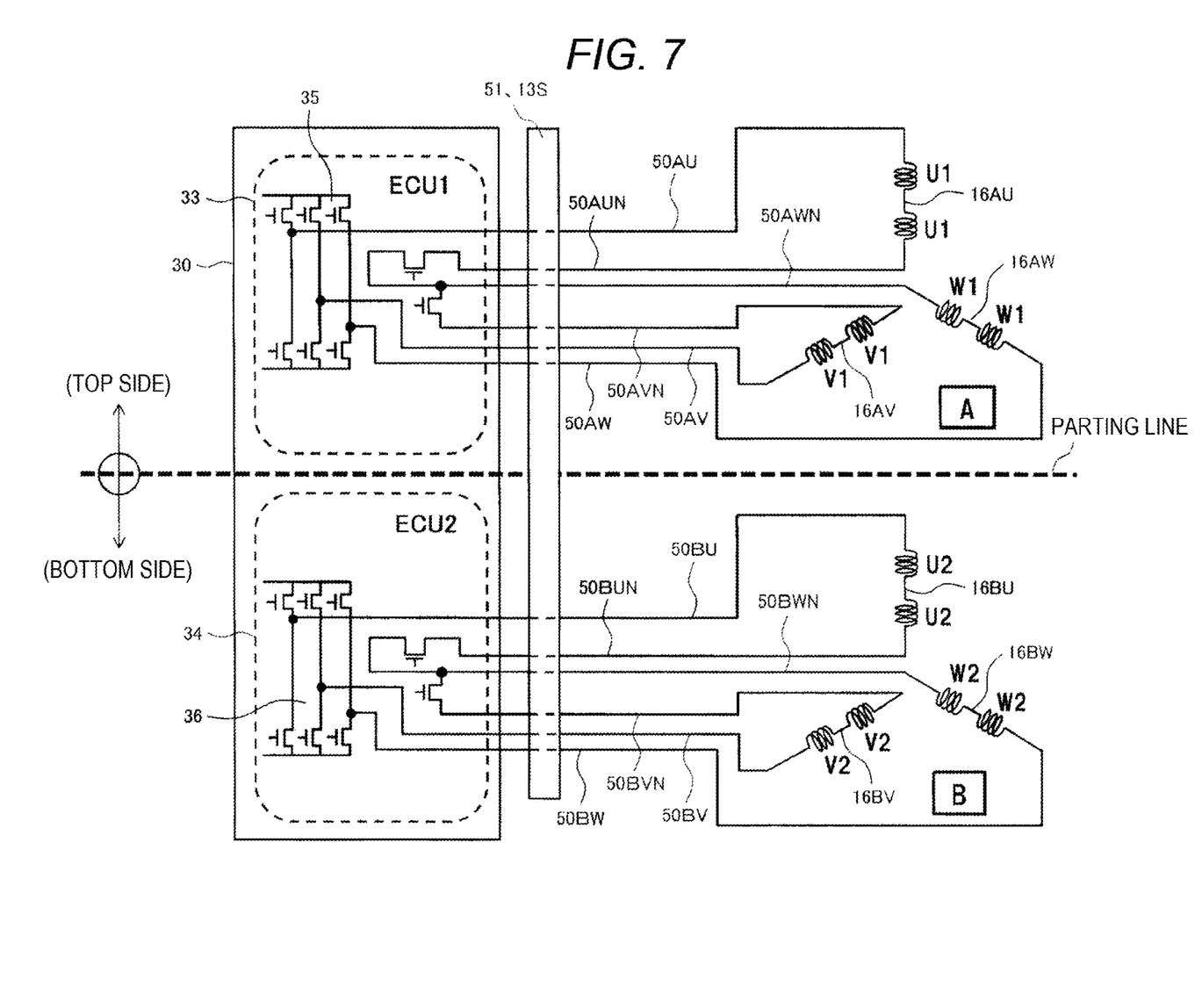
FIG. 7 is an explanatory diagram illustrating a wire connection state of an electric motor according to a first embodiment of the present invention.

In FIG. 7, two U-phase continuous windings 16AU, two V-phase continuous windings 16AV, and two W-phase continuous windings 16AW that form the A-system winding 16A are disposed on the "top side" of the electric motor unit 37. The U-phase lead wire 50AU, the V-phase lead wire 50AV, and the W-phase lead wire 50AW, which are in the A-system, are pulled out from the winding guide 27A formed on the side wall 13S or the waterproof wall 51 to the "top side" of the electronic control unit 30. Likewise, the U-phase neutral lead wire 50AUN, the V-phase neutral lead wire 50AVN, and the W-phase neutral lead wire 50AWN, which are in the A-system, are pulled out from the winding guide 27C formed on the side wall 13S or the waterproof wall 51 to the "top side" of the electronic control unit 30.

Furthermore, an A-system control unit 33 is disposed on the "top side" of the electronic control unit 30, and an A-system power conversion circuit 35 included in the A-system control unit 33 is connected to the above-described A-system lead wires 50AU to 50AW of each phase and the neutral lead wires 50AUN to 50AWN of each phase. Accordingly, the power of the A-system windings 16AU to 16AW of each phase is controlled by the A-system control unit 33. Here, the A-system control unit 33 includes a power supply circuit board, a power conversion circuit board, and a control circuit board, and these are stacked and disposed in the area on the "top side" along the axial direction of the motor shaft 22.

Likewise, two U-phase continuous windings 16BU, two V-phase continuous windings 16BV, and two W-phase continuous windings 16BW that form the B-system winding 16B are disposed on the "bottom side" of the electric motor unit 37. The U-phase lead wire 50BU, the V-phase lead wire 50BV, and the W-phase lead wire 50BW, which are in the B-system, are pulled out from the winding guide 27B formed on the waterproof wall 51 to the "bottom side" of the electronic control unit 30. The U-phase neutral lead wire 50BUN, the V-phase neutral lead wire 50BVN, and the W-phase neutral lead wire 50BWN, which are in the B-system, are also pulled out from the winding guide 27C formed on the waterproof wall 51 to the "bottom side" of the electronic control unit 30.

Furthermore, a B-system control unit 34 is disposed on the "bottom side" of the electronic control unit 30, and a B-system power conversion circuit 36 included in the B-system control unit 34 is connected to the above-described B-system lead wires 50BU to 50BW of each phase and the neutral lead wires 50BUN to 50BWN of each phase. Accordingly, the power of the B-system windings 16BU to 16BW of each phase is controlled by the B-system control unit 34. Here, the B-system control unit 34 also includes a power supply circuit board, a power conversion circuit board, and a control circuit board, and these are stacked and disposed in the area on the "bottom side" along the axial direction of the motor shaft 22.

In the configuration as described above, rainwater or the like tends to accumulate inside the housing 13 of the electric motor unit 37 from the "bottom side". The A-system winding 16A is thus disposed on the "top side", and the B-system winding 16B is disposed on the "bottom side". Accordingly, the operational state in which turning of the steering wheel 42 becomes heavy due to occurrence of a short circuit of the wire connection caused by penetration of rainwater or the like and generation of a brake torque occurs from the side of the B-system winding 16B disposed on the "bottom side".

When a short circuit of the wire connection occurs in the B-system winding 16B, a neutral point relay included in the B-system power conversion circuit 36 of the B-system control unit 34 opens the wire connection of the neutral point of the winding 16B to release the brake torque, and stops the operation of the B-system. Meanwhile, by continuing the operation of the A-system on the "top side", about a half of the steering assist function can be obtained until the "bottom side" inside the housing is submerged.

Therefore, the steering assist function of the steering can be continued accordingly, and the period until the steering assist function of the steering stops can be delayed. As a result, the assist function can be continued as much as possible to improve the functional safety of the power steering system.

Furthermore, the waterproof wall 51 and 13S having a waterproof function are provided at a portion where the inside of the electronic control unit 30 and the electric motor unit 37 are connected to each other so that rainwater or the like that has entered inside the housing 13 of the electric motor unit 37 does not enter inside the electronic control unit 30, whereby safety of the electronic control unit 30 against the rainwater or the like can be secured, and the effect of further improving the functional safety of the system can be obtained. Moreover, the electronic control unit 30 also has two systems of the A-system and the B-system, and the A-system control unit 33 is disposed on the "top side" and the B-system control unit 34 is disposed on the "bottom side", whereby the electric motor can be driven by the A-system control unit even if rainwater or the like enters the electronic control unit 30 and the B-system control unit 34 fails, and the functional safety can be further improved.

Second Embodiment

Next, a second embodiment of the present invention will be described. Descriptions of the configuration same as that of the first embodiment will be omitted. In addition, since the present embodiment exerts action and effects same as those of the first embodiment, duplicate descriptions of the same action and effects will be omitted. The present embodiment is different from the first embodiment in that a B-system control unit 34 is disposed at a position across the "top side" and the "bottom side".

Figure 8:
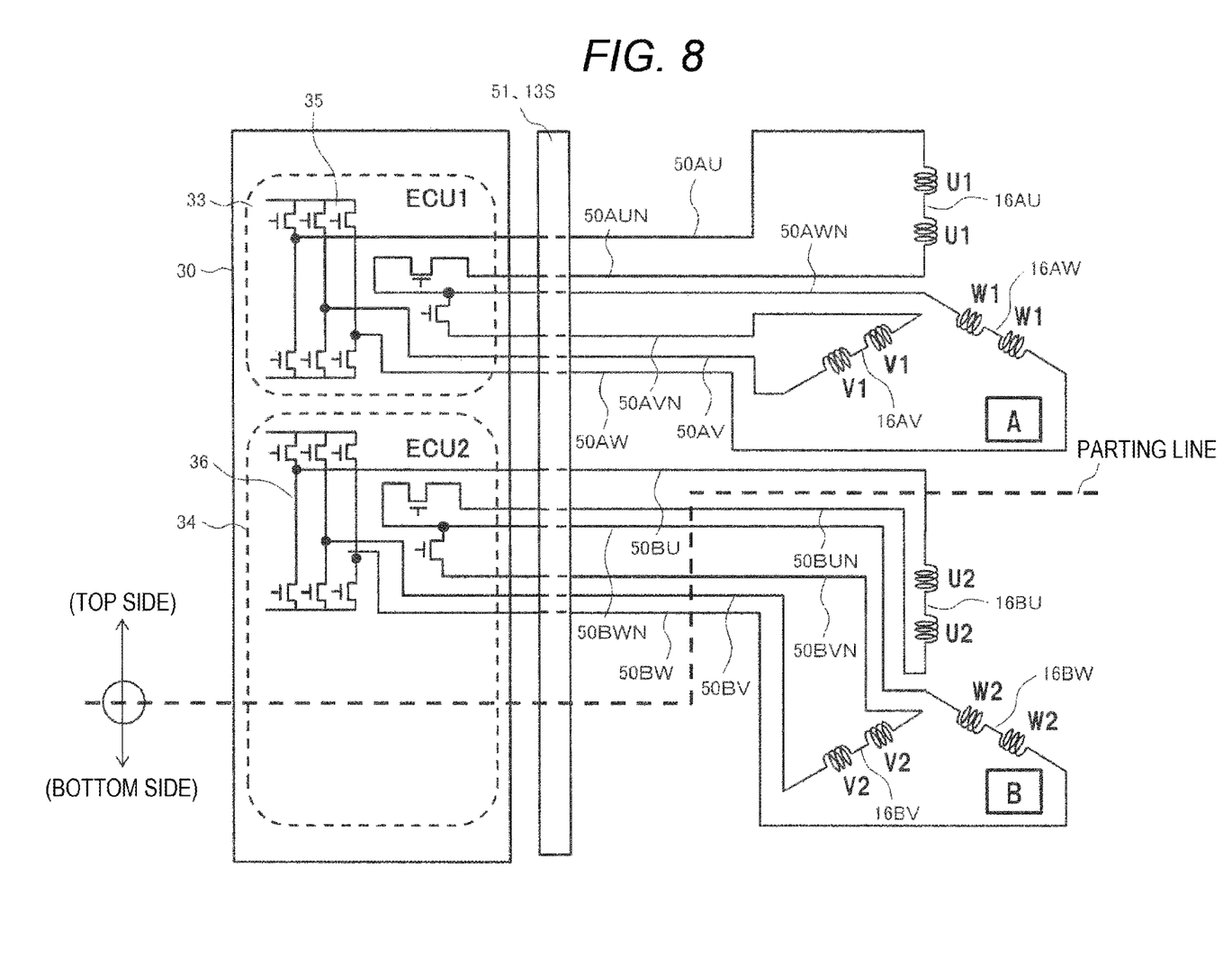
FIG. 8 is an explanatory diagram illustrating a wire connection state of an electric motor according to a second embodiment of the present invention.

In FIG. 8, winding guides 27B and 27C are formed at a position on the "top side" of a side wall 13S or a waterproof wall 51, and the B-system control unit 34 is disposed on the "top side" and the "bottom side". A B-system power conversion circuit 36 included in the B-system control unit 34 is disposed on the "top side", and is connected to B-system lead wires 50BU to 50BW of each phase and neutral lead wires 50BUN to 50BWN of each phase.

Accordingly, lead wires 50AU to 50AW of each phase and neutral lead wires 50AUN to 50AWN of each phase of an A-system winding 16A, and lead wires 50BU to 50BW of each phase and neutral lead wires 50BUN to 50BWN of each phase of a B-system winding 16B, which are disposed on an electric motor unit 37, are all disposed on the "top side", whereby functional safety for the lead wires of each phase of a motor and neutral points of both systems can be further improved.

Note that, if an electronic control unit 30 is extended in the radial direction, a power supply circuit board, a power conversion circuit board, and a control circuit board of an A-system control unit 33 and the B-system control unit 34 can be disposed on the "top side" to be shared and used.

Third Embodiment

Next, a third embodiment of the present invention will be described. Descriptions of the configuration same as that of the first embodiment will be omitted. In addition, since the present embodiment also exerts action and effects same as those of the first embodiment, duplicate descriptions of the same action and effects will be omitted. The present embodiment is different from the first embodiment in that an A-system control unit 33 and a B-system control unit 34 are disposed on the "top side".

Figure 9:
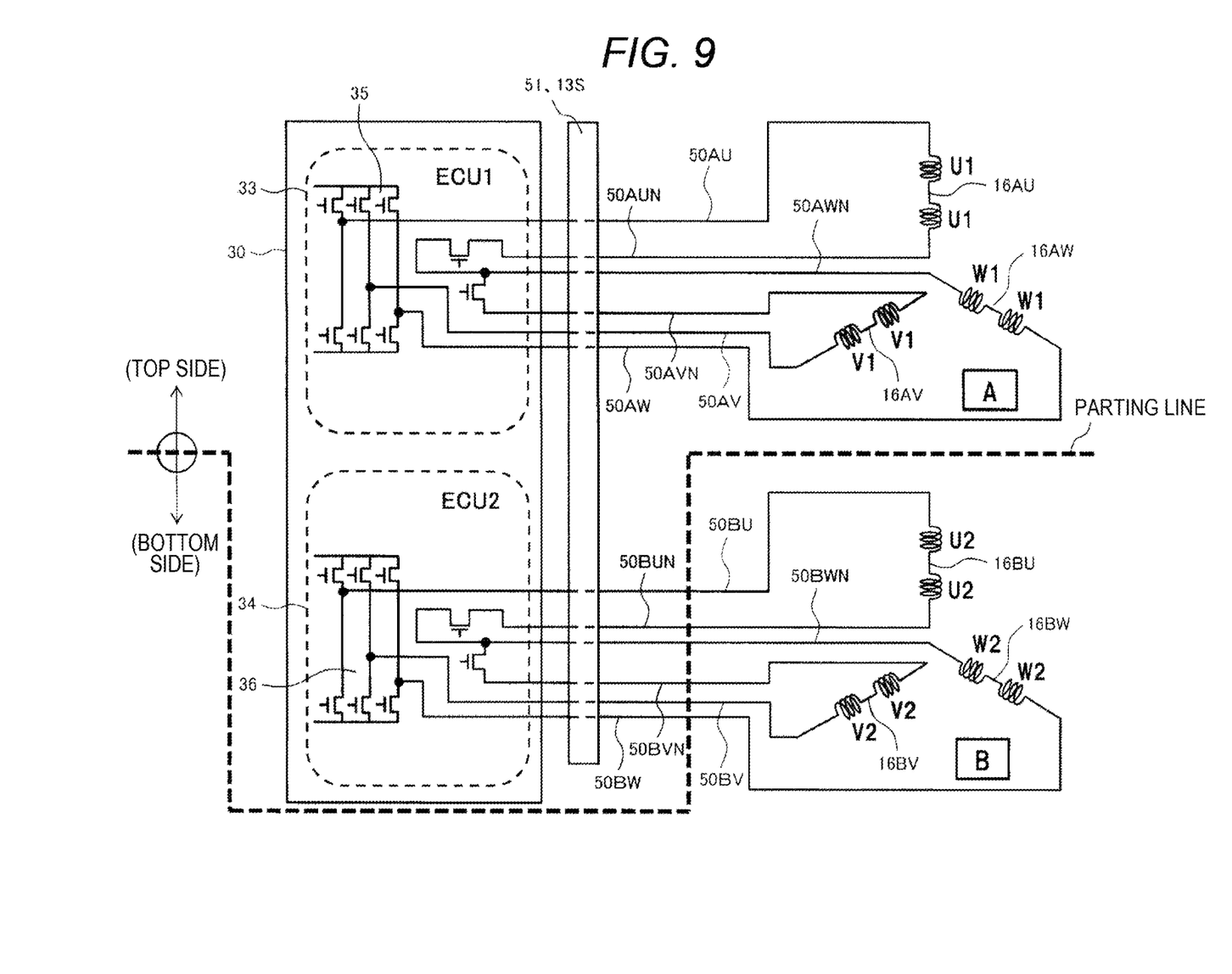
FIG. 9 is an explanatory diagram illustrating a wire connection state of an electric motor according to a third embodiment of the present invention.

In FIG. 9, winding guides 27B and 27C are formed on the "top side" of a side wall 13S or a waterproof wall 51, and the B-system control unit 34 is further disposed. A B-system power conversion circuit 36 included in the B-system control unit 34 is connected to the above-described B-system lead wires 50BU to 50BW of each phase and neutral lead wires 50BUN to 50BWN of each phase.

Accordingly, since the arrangement position of the B-system control unit 34 is set higher than that of the second embodiment, the B-system control unit 34, lead wires 50AU to 50AW of each phase and neutral lead wires 50AUN to 50AWN of each phase of an A-system winding 16A, and lead wires 50BU to 50BW of each phase and neutral lead wires 50BUN to 50BWN of each phase of a B-system winding 16B, which are disposed on an electric motor unit 37, are all disposed on the "top side", whereby functional safety for the lead wires of each phase of a motor and neutral points of both systems and control units of both systems can be further improved.

As described above, while a power supply circuit board, a power conversion circuit board, and a control circuit board of each of the A-system control unit 33 and the B-system control unit 34 are stacked and disposed in the area on the "top side" along the axial direction of an motor shaft 22, if an electronic control unit 30 is extended in the radial direction, the power supply circuit board, the power conversion circuit board, and the control circuit board of the A-system control unit 33 and the B-system control unit 34 can be disposed on the "top side" to be shared and used. Note that the space on the "bottom side" of the electronic control unit 30 remains so that other constituent parts can be disposed therein, whereby an effect of improving space utilization efficiency can also be expected.

As described above, according to the present invention, a stator around which a winding is wound is vertically divided into two areas in the direction of gravity, a winding of one system is wound in the upper area of the stator while a winding of the other system is wound in the lower area of the stator, and power of the winding of one system is controlled by an electronic control means of one system while power of the winding of the other system is controlled by an electronic control means of the other system.

Accordingly, even if moisture enters inside the housing of the electric motor due to breakage of a rubber boot, occurrence of an electrical short circuit phenomenon is suppressed at least in the winding wound on the upper side, whereby a steering assist can be continued.

Note that the present invention is not limited to the embodiments described above, and includes various modifications. For example, the above-described embodiments have been described in detail for convenience of explaining the present invention in a manner easy to understand, and are not necessarily limited to those having all the described configurations. A configuration of one embodiment may be partially replaced with a configuration of another embodiment, and the configuration of the other embodiment may be added to the configuration of one embodiment. It is also possible to add, delete, and replace other configurations with respect to a part of the configuration of each embodiment.

REFERENCE SIGNS LIST

11 motor pulley
12 front bracket
13 housing
14 stator core
15 bobbin
16A, 16AU, 16AV, 16AWB winding of A-system
16B, 16BU, 16BV, 16BWB winding of B-system
17 front bearing
18 rear bearing
19 preload spring
20 rotor core
21 permanent magnet
22 motor shaft
23 seal groove
25 fastening bolt
26 jumper wire
27 winding guide
30 electronic control unit
31 metallic case
32 connector
33 A-system control unit
34 B-system control unit
35 A-system power conversion circuit
36 B-system power conversion circuit
37 electric motor unit
38 gear pulley
39 belt
40 fastening bolt
41 steering shaft
42 steering wheel
43 rack case
44 rack shaft
45 tire
46 reduction gear case
47 electric power steering device
48 rubber boot
50AU U-phase lead wire
50AV V-phase lead wire
50AW W-phase lead wire
50AUN U-phase neutral lead wire
50AVN V-phase neutral lead wire
50AWN W-phase neutral lead wire
50BU U-phase lead wire
50BV V-phase lead wire
50BW W-phase lead wire
50BUN U-phase neutral lead wire
50BVN V-phase neutral lead wire
50BWN W-phase neutral lead wire
51 waterproof wall

The invention claimed is:

1. An electric power steering device, comprising: an electric motor unit that includes a housing containing an electric motor for applying steering assist force to a steering shaft; and an electronic control unit that contains a control unit for controlling the electric motor, the electronic control unit being disposed on a side surface side of the housing on an opposite side of an output part of a motor shaft of the electric motor, wherein
    a stator around which a winding of the electric motor is wound is divided into two areas of an upper stator area and a lower stator area in a direction of gravity, a winding of one system is wound in the upper stator area of the stator while a winding of another system is wound in the lower stator area of the stator, and the upper stator area and the lower stator area are divided into upper and lower parts with an axial line of the motor shaft of the electric motor serving as a parting line.

2. The electric power steering device according to claim 1, wherein
    the control unit includes an electronic control means of one system that controls power of the winding of one system, and an electronic control means of the other system that controls power of the winding of the other system.

3. The electric power steering device according to claim 1, wherein
    the electronic control unit is divided into two areas of an upper area and a lower area corresponding to the upper stator area and the lower stator area, and
    an electronic control means of the one system is disposed in the upper area of the electronic control unit, and an electronic control means of the other system is disposed in the lower area of the electronic control unit.

4. The electric power steering device according to claim 1, wherein
    the electronic control unit is divided into two areas of an upper area and a lower area corresponding to the upper stator area and the lower stator area, and
    an electronic control means of the one system is disposed in the upper area of the electronic control unit, and an electronic control means of the other system is disposed across the lower area and the upper area of the electronic control unit.

5. The electric power steering device according to claim 1, wherein
    the electronic control unit is divided into two areas of an upper area and a lower area corresponding to the upper stator area and the lower stator area, and
    an electronic control means of the one system and an electronic control means of the other system are disposed in the upper area of the electronic control unit.

6. The electric power steering device according to claim 1, wherein
   a waterproof wall for suppressing penetration of moisture from the electric motor unit is formed between the electric motor unit and the electronic control unit.

7. A rack assist-type steering device, comprising: an electric power steering device that applies steering assist force to a steering shaft on the basis of output from a torque sensor for detecting a revolving direction and a revolving torque of the steering shaft, wherein
   the electric power steering device according to claim 1 is used as the electric power steering device.

\* \* \* \* \*